US009319189B2

(12) United States Patent  
Seo et al.

(10) Patent No.: US 9,319,189 B2  
(45) Date of Patent: Apr. 19, 2016

(54) METHOD AND APPARATUS FOR CONTROLLING INTER-CELL INTERFERENCE IN WIRELESS COMMUNICATION SYSTEM

(75) Inventors: Inkwon Seo, Anyang-si (KR); Hanbyul Seo, Anyang-si (KR); Kijun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 43 days.

(21) Appl. No.: 14/124,990

(22) PCT Filed: Jun. 28, 2012

(86) PCT No.: PCT/KR2012/005118  
§ 371 (c)(1),  
(2), (4) Date: Dec. 9, 2013

(87) PCT Pub. No.: WO2013/002572  
PCT Pub. Date: Jan. 3, 2013

(65) Prior Publication Data  
US 2014/0112216 A1    Apr. 24, 2014

Related U.S. Application Data

(60) Provisional application No. 61/502,851, filed on Jun. 29, 2011.

(51) Int. Cl.  
*H04J 3/00* (2006.01)  
*H04L 5/00* (2006.01)  
(Continued)

(52) U.S. Cl.  
CPC ............ *H04L 5/0032* (2013.01); *H04J 11/005* (2013.01); *H04L 5/14* (2013.01); *H04L 5/001* (2013.01); *H04L 5/0073* (2013.01); *H04L 5/1469* (2013.01)

(58) Field of Classification Search  
None  
See application file for complete search history.

(56) References Cited

U.S. PATENT DOCUMENTS 8,848,520 B2 * 9/2014 Chen et al. ................. 370/229  
2008/0057934 A1  3/2008 Sung et al.  
2008/0144612 A1  6/2008 Honkasalo et al.  
(Continued)

FOREIGN PATENT DOCUMENTS

CN          1617473 A    5/2005  
CN        101558608 A   10/2009  
(Continued)

OTHER PUBLICATIONS

CATT, "Uplink-downlink Subframe Configuration Information for the Served Cell," 3GPP TSG RAN WG3 Meeting #61, R3-082018, Jeju, Korea, Aug. 18-22, 2008, pp. 1-2.  
(Continued)

*Primary Examiner* — Phirin Sam  
(74) *Attorney, Agent, or Firm* — Birch, Stewart, Kolasch & Birch, LLP

(57) ABSTRACT

The present invention pertains to a wireless communication system, and more particularly, to a method for transmitting an uplink (UL) signal in a time division duplex (TDD) wireless communication system and an apparatus therefor, and the method comprises the following steps: receiving information limiting UL transmission activity from a serving cell; and transmitting a UL subframe in consideration of the information, wherein signal transmission of specific time-frequency resources corresponding to the information in the UL subframe is limited.

10 Claims, 11 Drawing Sheets

(b)

(51) Int. Cl.
*H04J 11/00* (2006.01)
*H04L 5/14* (2006.01)

(56) References Cited

U.S. PATENT DOCUMENTS

| | | |
|---|---|---|
| 2008/0152029 A1 | 6/2008 | Kwon et al. |
| 2008/0310329 A1 | 12/2008 | Sun et al. |
| 2009/0247181 A1 | 10/2009 | Palanki et al. |
| 2010/0041388 A1 | 2/2010 | Kawasaki |
| 2010/0103860 A1 | 4/2010 | Kim et al. |
| 2010/0157927 A1 | 6/2010 | Mochizuki et al. |
| 2010/0238878 A1 | 9/2010 | Jang |
| 2011/0105107 A1 | 5/2011 | Kwon et al. |
| 2011/0149813 A1* | 6/2011 | Parkvall et al. ............... 370/280 |
| 2011/0310853 A1* | 12/2011 | Yin et al. ...................... 370/335 |
| 2012/0008700 A1 | 1/2012 | Dateki et al. |
| 2012/0113831 A1* | 5/2012 | Pelletier et al. ............... 370/252 |
| 2012/0202540 A1 | 8/2012 | Lee et al. |

FOREIGN PATENT DOCUMENTS

| | | |
|---|---|---|
| EP | 1 895 795 A2 | 3/2008 |
| JP | 2005-295200 A | 10/2005 |
| JP | 2010-506486 A | 2/2010 |
| JP | 2011-517896 A | 6/2011 |
| KR | 10-0765892 B1 | 10/2007 |
| KR | 10-2010-0032368 A | 3/2010 |
| KR | 10-2011-0040711 A | 4/2011 |
| WO | WO 2009/001594 A1 | 12/2008 |
| WO | WO 2010/050705 A2 | 5/2010 |
| WO | WO 2010/116397 A1 | 10/2010 |
| WO | WO 2011/019835 A2 | 2/2011 |

OTHER PUBLICATIONS

New Postcom, "ABS Signaling Considerations for LTE-A TDD," 3GPP TSG RAN WG1 Meeting #63, R1-105940, Jacksonville, USA, Nov. 15-19, 2010, pp. 1-4.

"3rd Generation Partnership Project; Technical Specification Group Radio Access Network; Physical layer aspects for evolved Universal Terrestrial Radio Access (UTRA)(Release 7)", 3GPP TR 25.814. vol. 7.1.0, Sep. 2006, 5 pages.

* cited by examiner

METHOD AND APPARATUS FOR CONTROLLING INTER-CELL INTERFERENCE IN WIRELESS COMMUNICATION SYSTEM

CROSS REFERENCE TO RELATED APPLICATIONS

This application is the National Phase of PCT/KR2012/005118 filed on Jun. 28, 2012, which claims priority under 35 U.S.C. §119(e) to U.S. Provisional Application No. 61/502,851 filed on Jun. 29, 2011, all of which are hereby expressly incorporated by reference into the present application.

TECHNICAL FIELD

The present invention relates to a wireless communication system, and more particularly, to a method and apparatus for controlling inter-cell interference. The wireless communication system supports homogenous and/or heterogeneous network systems.

BACKGROUND ART

Wireless communication systems have been widely deployed to provide various types of communication services including voice and data services. In general, a wireless communication system is a multiple access system that supports communication among multiple users by sharing available system resources (e.g. bandwidth, transmit power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), or Single Carrier Frequency Division Multiple Access (SC-FDMA).

DISCLOSURE

Technical Problem

An object of the present invention devised to solve the problem lies in a method for efficiently controlling inter-cell interference in a wireless communication system and an apparatus for the same. Another object of the present invention is to provide a method and apparatus for signaling and signal processing for controlling inter-cell interference and an apparatus for the same. A further object of the present invention is to provide a method for efficiently allocating resources to a cell edge UE.

The technical problems solved by the present invention are not limited to the above technical problems and those skilled in the art may understand other technical problems from the following description.

Technical Solution

The object of the present invention can be achieved by providing a method for transmitting an uplink (UL) signal in a time division duplex (TDD) wireless communication system, the method including: receiving information limiting UL transmission activation from a serving cell; and transmitting a UL subframe based on the information, wherein signal transmission through specific time-frequency resources corresponding to the information in the UL subframe is limited.

In another aspect of the present invention, provided herein is a communication apparatus configured to transmit a UL signal in a TDD wireless communication system, including: a radio frequency (RF) unit; and a processor, wherein the processor is configured to receive information limiting UL transmission activation from a serving cell and to transmit a UL subframe based on the information, wherein signal transmission through specific time-frequency resources corresponding to the information in the UL subframe is limited.

The information may include information indicating a subframe set in which UL transmission activation is limited.

The information may include information indicating a specific signal corresponding to the specific time-frequency resources, the specific signal corresponding to at least one of a reference signal (RS), a broadcast channel (BCH) and a synchronization channel (SCH).

The UL subframe may include a plurality of single carrier frequency division multiple access (SC-FDMA) symbols and signal transmission of SC-FDMA symbols corresponding to the specific time-frequency resources may be limited.

Limitation of signal transmission of the specific time-frequency resources may comprise mapping UL data to all allocated time-frequency resources including the specific time-frequency resources and then puncturing the UL data in the specific time-frequency resources.

Limitation of signal transmission of the specific time-frequency resources may comprise mapping UL transmission data to time-frequency resources on the UL subframe while skipping at least the specific time-frequency resources.

Advantageous Effects

According to the present invention, it is possible to efficiently control inter-cell interference in a wireless communication system. In addition, it is possible to efficiently perform signaling and signal processing for controlling inter-cell interference. Furthermore, it is possible to efficiently allocate resources to a cell edge UE.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention, illustrate embodiments of the invention and together with the description serve to explain the principle of the invention. In the drawings.

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), and Single Carrier Frequency Division Multiple Access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). $3^{rd}$ Generation Partnership Project (3GPP) Long Term Evolution (LTE) is a part of Evolved UMTS (E-UMTS) using E-UTRA, employing OFDMA for downlink and SC-FDMA for uplink. LTE-Advanced (LTE-A) is evolved from 3GPP LTE. While the following description is given, centering on 3GPP LTE/LTE-A for clarity, this is purely exemplary and thus should not be construed as limiting the present invention.

Figure 1:
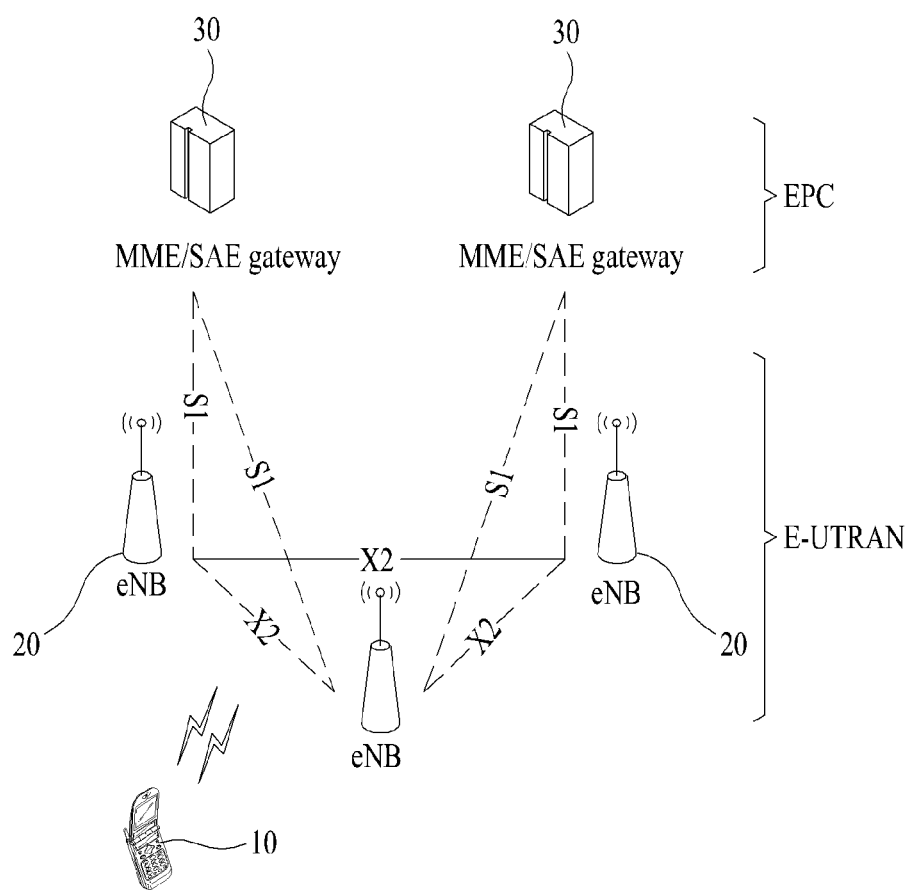
FIG. 1 illustrates an E-UMTS network structure.

FIG. 1 illustrates an E-UMTS network structure. E-UMTS is also called LTE system. A communication network is deployed in a wide range and provides various communication services such as audio, VoIP (voice over IP) through IMS (IP multimedia subsystem), packet data, etc.

As shown in FIG. 1, E-UMTS network includes an enhanced UMTS terrestrial radio access network (E-UTRAN), an enhanced packet core (EPC) and one or more user equipments. The E-UTRAN can include one or more eNBs 20 and a plurality of UEs 10 can be located in a cell. The eNBs can be connected through X2 interface. X2 user plane interface X2-U is defined among eNBs. X2-U provides non-guaranteed delivery of user plane PDU. X2 control plane interface X2-CP is defined between neighboring eNBs. X2-CP executes functions of delivering context between eNBs, controlling a user plane tunnel between a source eNB and a target eNB, delivering handover related messages, managing uplink load, etc. An eNB is linked to a UE through a radio interface and linked to an EPC (evolved packet core) through S1 interface. S1 user plane interface S1-U is defined between an eNB and a S-GW (serving gateway). S1 control plane interface S1-MME is defined between an eNB and an MME (mobility management entity). S1 interface executes an EPS (evolved packet system) bearer service management function, NAS (non-access stratum) signaling transport function, network sharing function, MME load balancing function, etc.

In a wireless communication system, a UE receives information through downlink (DL) from an eNB and transmits information through uplink (UL) to the eNB. Information transmitted and received between the UE and the eNB includes data and various types of control information and various physical channels are present according to types/usages of the information.

Figure 2:
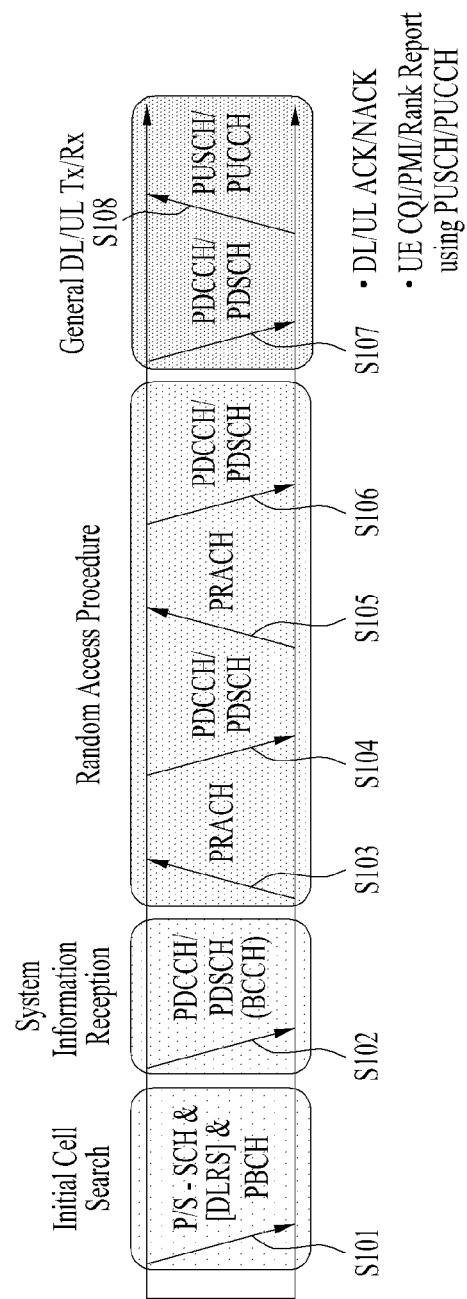
FIG. 2 illustrates physical channels used in a 3GPP LTE system as a wireless communication system and a signal transmission method using the same.

FIG. 2 illustrates physical channels used in a 3GPP LTE system and a signal transmission method using the same.

When powered on or when a UE initially enters a cell, the UE performs initial cell search involving synchronization with a BS in step S101. For initial cell search, the UE synchronizes with the BS and acquire information such as a cell Identifier (ID) by receiving a primary synchronization channel (P-SCH) and a secondary synchronization channel (S-SCH) from the BS. Then the UE may receive broadcast information from the cell on a physical broadcast channel (PBCH). In the mean time, the UE may check a downlink channel status by receiving a downlink reference signal (DL RS) during initial cell search.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Here, control information transmitted from the UE to the BS is called uplink control information (UCI). The UCI may include a hybrid automatic repeat and request (HARQ) acknowledgement (ACK)/negative-ACK (HARQ ACK/NACK) signal, a scheduling request (SR), channel state information (CSI), etc. The CSI includes a channel quality indicator (CQI), a precoding matrix index (PMI), a rank indicator (RI), etc. While the UCI is transmitted through a PUCCH in general, the UCI may be transmitted through a PUSCH when control information and traffic data need to be simultaneously transmitted. The UCI may be a periodically transmitted through a PUSCH at the request/instruction of a network.

Figure 3:
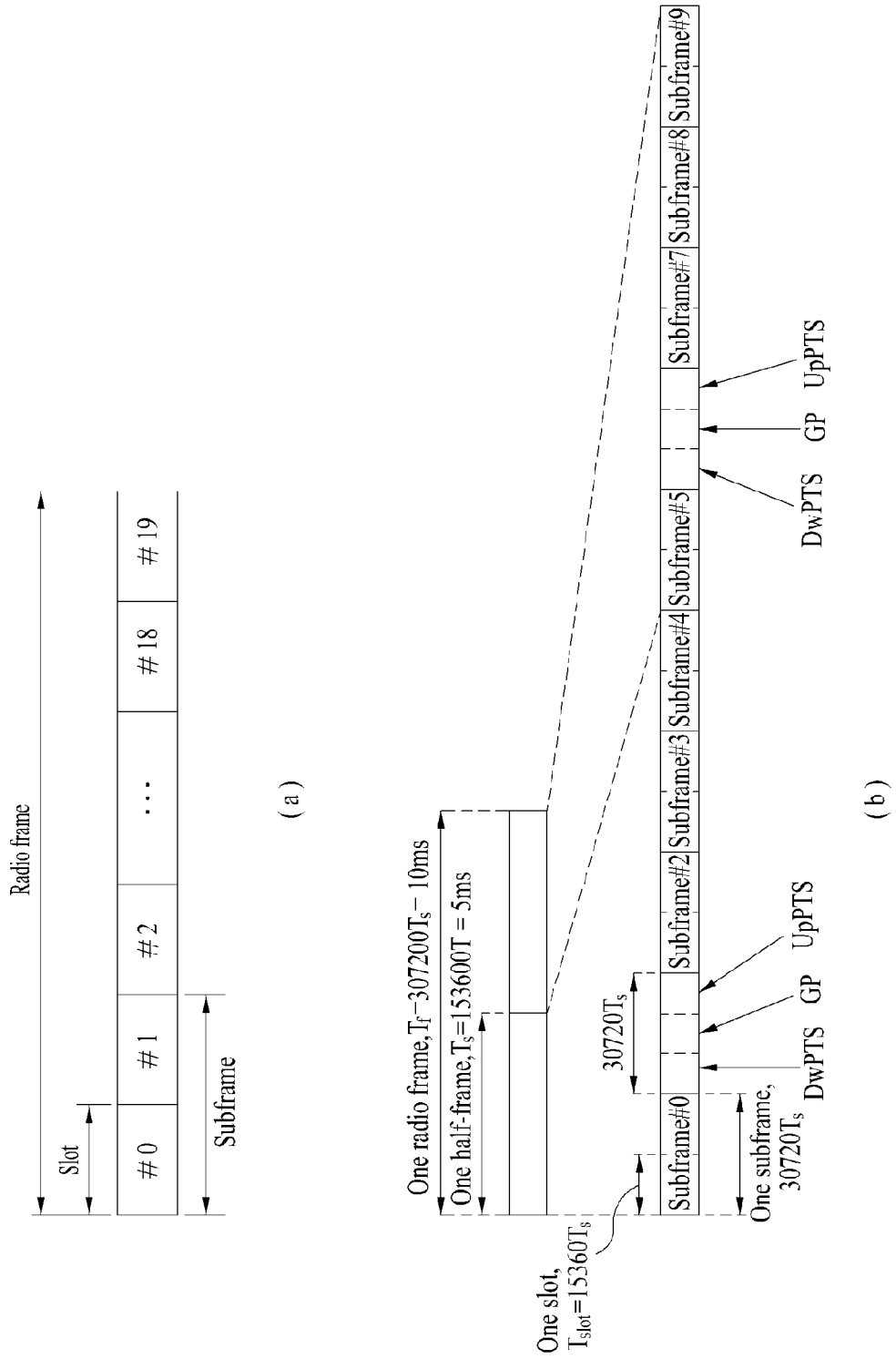
FIG. 3 illustrates a radio frame structure.

FIG. 3 illustrates a radio frame structure. In a cellular OFDM wireless packet communication system, uplink/downlink data packet transmission is performed on a subframe-by-subframe basis. A subframe is defined as a predetermined time interval including a plurality of OFDM symbols. 3GPP LTE supports a type-1 radio frame structure applicable to FDD (Frequency Division Duplex) and a type-2 radio frame structure applicable to TDD (Time Division Duplex).

FIG. 3(a) illustrates a type-1 radio frame structure. A downlink subframe includes 10 subframes each of which includes 2 slots in the time domain. A time for transmitting a subframe is defined as a transmission time interval (TTI). For example, each subframe has a length of 1 ms and each slot has a length of 0.5 ms. A slot includes a plurality of OFDM symbols in the time domain and includes a plurality of resource blocks (RBs) in the frequency domain. Since downlink uses OFDM in 3GPP LTE, an OFDM symbol represents a symbol period. The OFDM symbol may be called an SC- FDMA symbol or symbol period. An RB as a resource allocation unit may include a plurality of consecutive subcarriers in one slot.

The number of OFDM symbols included in one slot may depend on cyclic prefix (CP) configuration. CPs include an extended CP and a normal CP. When an OFDM symbol is configured with the normal CP, for example, the number of OFDM symbols included in one slot may be 7. When an OFDM symbol is configured with the extended CP, the length of one OFDM symbol increases, and thus the number of OFDM symbols included in one slot is smaller than that in case of the normal CP. In case of the extended CP, the number of OFDM symbols allocated to one slot may be 6. When a channel state is unstable, such as a case in which a UE moves at a high speed, the extended CP can be used to reduce inter-symbol interference.

When the normal CP is used, one subframe includes 14 OFDM symbols since one slot has 7 OFDM symbols. The first three OFDM symbols at most in each subframe can be allocated to a PDCCH and the remaining OFDM symbols can be allocated to a PDSCH.

FIG. 3(b) illustrates a type-2 radio frame structure. The type-2 radio frame includes 2 half frames. Each half frame includes 5 subframes. A subframe may be one of a downlink subframe, an uplink subframe and a special subframe. The special subframe can be used as a downlink subframe or an uplink subframe according to TDD configuration. The special subframe includes a downlink pilot time slot (DwPTS), a guard period (GP), and an uplink pilot time slot (UpPTS). The DwPTS is used for initial cell search, synchronization or channel estimation in a UE. The UpPTS is used for channel estimation in a BS and UL transmission synchronization acquisition in a UE. The GP eliminates UL interference caused by multi-path delay of a DL signal between a UL and a DL.

Table 1 shows UL-DL configurations defined in LTE TDD.

TABLE 1

| Uplink-downlink Configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

* D denotes a downlink subframe, U denotes an uplink subframe and S denotes a special subframe.

The above-described radio frame structure is merely exemplary and the number of subframes included in the radio frame, the number of slots included in a subframe, and the number of symbols included in a slot can be vary.

Figure 4:
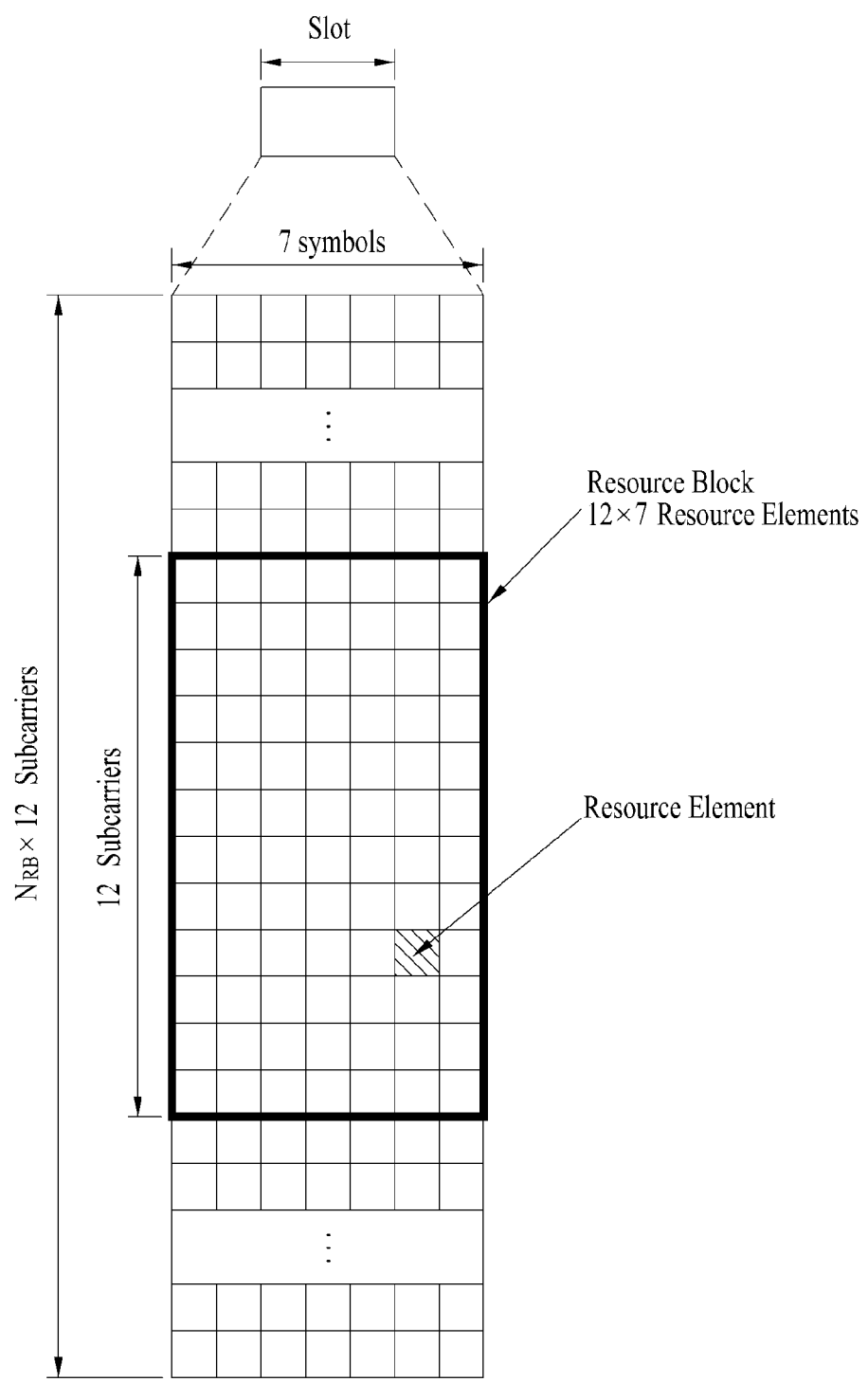
FIG. 4 illustrates a resource grid of a downlink slot.

FIG. 4 illustrates a resource grid of a downlink slot.

Referring to FIG. 4, a downlink slot includes a plurality of OFDM symbols in the time domain. One downlink slot may include 7(6) OFDM symbols, and one resource block (RB) may include 12 subcarriers in the frequency domain. Each element on the resource grid is referred to as a resource element (RE). One RB includes 12×7(6) REs. The number $N_{RB}$ of RBs included in the downlink slot depends on a downlink transmit bandwidth. The structure of an uplink slot may be same as that of the downlink slot except that OFDM symbols by replaced by SC-FDMA symbols.

Figure 5:
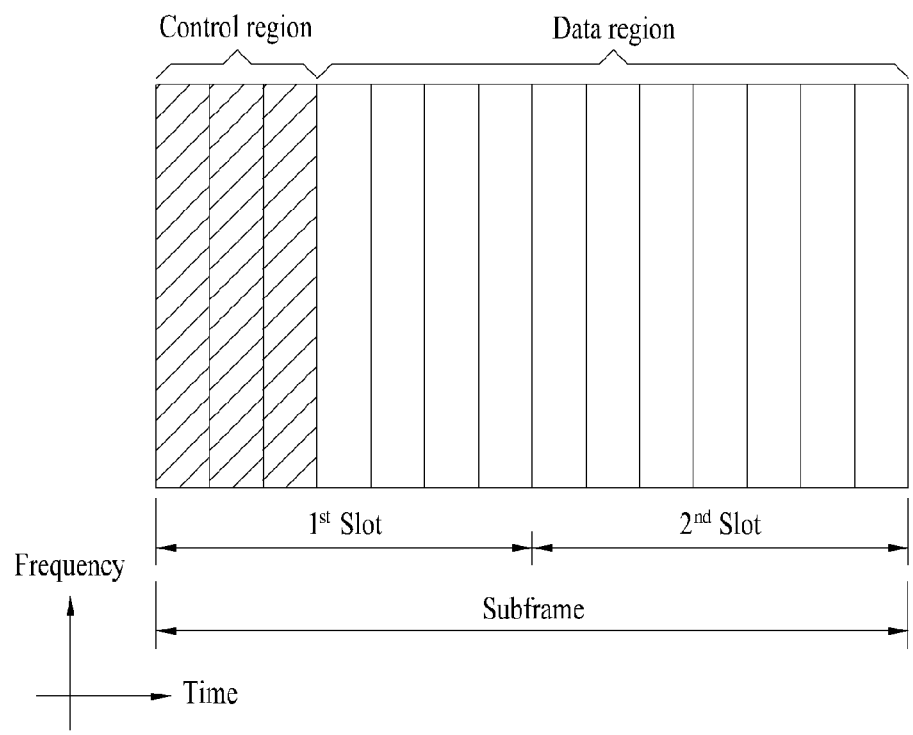
FIG. 5 illustrates a downlink subframe structure.

FIG. 5 illustrates a downlink subframe structure.

Referring to FIG. 5, a maximum of 3 (4) OFDM symbols located in a front portion of a first slot within a subframe correspond to a control region to which a control channel is allocated. The remaining OFDM symbols correspond to a data region to which a physical downlink shared chancel (PDSCH) is allocated. Examples of downlink control channels used in LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative-acknowledgment (NACK) signal.

Control information transmitted through the PDCCH is referred to as downlink control information (DCI). The DCI includes resource allocation information and other control information for a UE or UE group. For example, the DCI includes uplink/downlink scheduling information, an uplink transmit (Tx) power control command, etc.

A PDCCH may carry a transport format and a resource allocation of a downlink shared channel (DL-SCH), resource allocation information of an uplink shared channel (UL-SCH), paging information on a paging channel (PCH), system information on the DL-SCH, information on resource allocation of an upper-layer control message such as a random access response transmitted on the PDSCH, a set of Tx power control commands on individual UEs within an arbitrary UE group, a Tx power control command, information on activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). A format of the PDCCH and the number of bits of the available PDCCH are determined by the number of CCEs. The BS determines a PDCCH format according to DCI to be transmitted to the UE, and attaches a cyclic redundancy check (CRC) to control information. The CRC is masked with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be masked to the CRC. Alternatively, if the PDCCH is for a paging message, a paging identifier (e.g., paging-RNTI (P-RNTI)) may be masked to the CRC. If the PDCCH is for system information (more specifically, a system information block (SIB)), a system information RNTI (SI-RNTI) may be masked to the CRC. When the PDCCH is for a random access response, a random access-RNTI (RA-RNTI) may be masked to the CRC.

Figure 6:
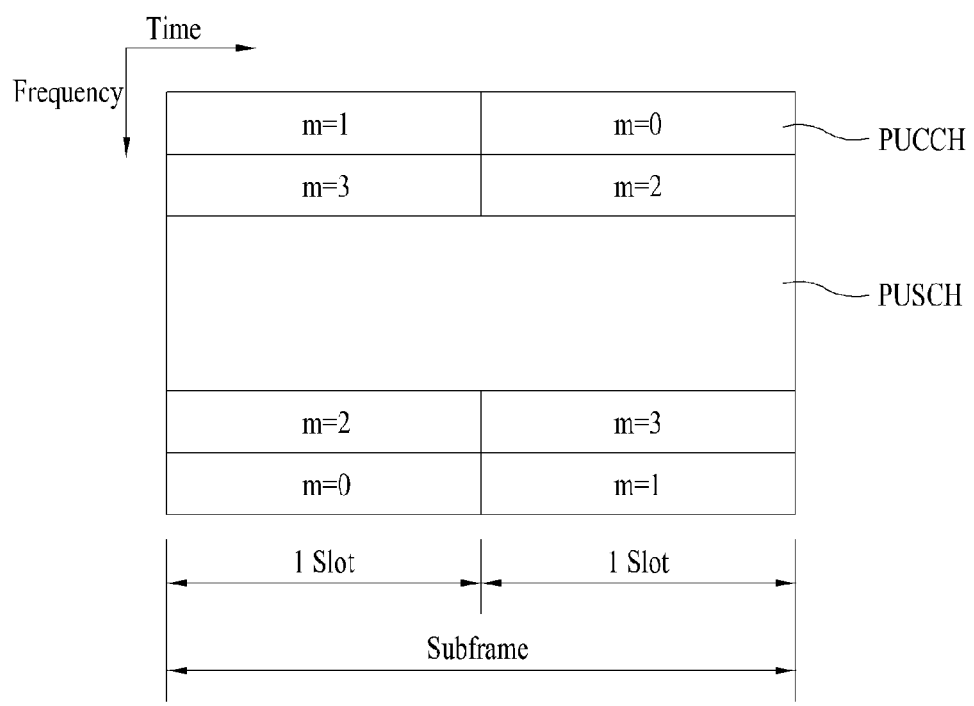
FIG. 6 illustrates an uplink subframe structure.

FIG. 6 illustrates an uplink subframe structure used in LTE.

Referring to FIG. 6, an uplink subframe includes a plurality of (e.g. 2) slots. A slot may include different numbers of SC-FDMA symbols according to CP lengths. The uplink subframe is divided into a control region and a data region in the frequency domain. The data region is allocated with a PUSCH and used to carry a data signal such as audio data. The control region is allocated a PUCCH and used to carry uplink control information (UCI). The PUCCH includes an RB pair located at both ends of the data region in the frequency domain and hopped in a slot boundary.

The PUCCH can be used to transmit the following control information.

SR (scheduling request): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords.

CQI (channel quality indicator): This is feedback information about a downlink channel. Feedback information regarding Multiple Input Multiple Output (MIMO) includes Rank Indicator (RI) and Precoding Matrix Indicator (PMI). 20 bits are used for each subframe.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a Sounding Reference Signal (SRS) is configured, the last SC-FDMA symbol of the subframe is excluded from the SC-FDMA symbols available for control information transmission. A reference signal is used to detect coherence of the PUCCH. The PUCCH supports 7 formats according to information transmitted thereon.

Table 2 shows the mapping relationship between PUCCH formats and UCI in LTE.

TABLE 2

| PUCCH format | Uplink Control Information (UCI) |
| --- | --- |
| Format 1 | Scheduling request (SR) (unmodulated waveform) |
| Format 1a | 1-bit HARQ ACK/NACK with/without SR |
| Format 1b | 2-bit HARQ ACK/NACK with/without SR |
| Format 2 | CQI (20 coded bits) |
| Format 2 | CQI and 1- or 2-bit HARQ ACK/NACK (20 bits) for extended CP only |
| Format 2a | CQI and 1-bit HARQ ACK/NACK (20 + 1 coded bits) |
| Format 2b | CQI and 2-bit HARQ ACK/NACK (20 + 2 coded bits) |

Figure 7:
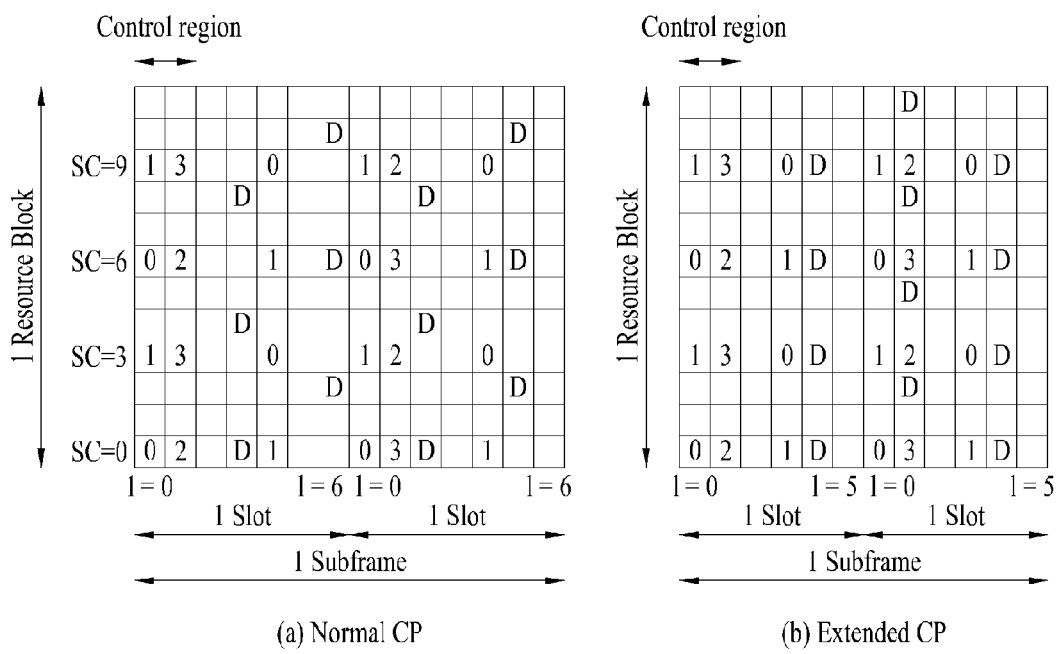
FIG. 7 illustrates a downlink reference signal.

FIG. 7 illustrates a downlink reference signal (RS) pattern of an LTE system.

Figure 8:
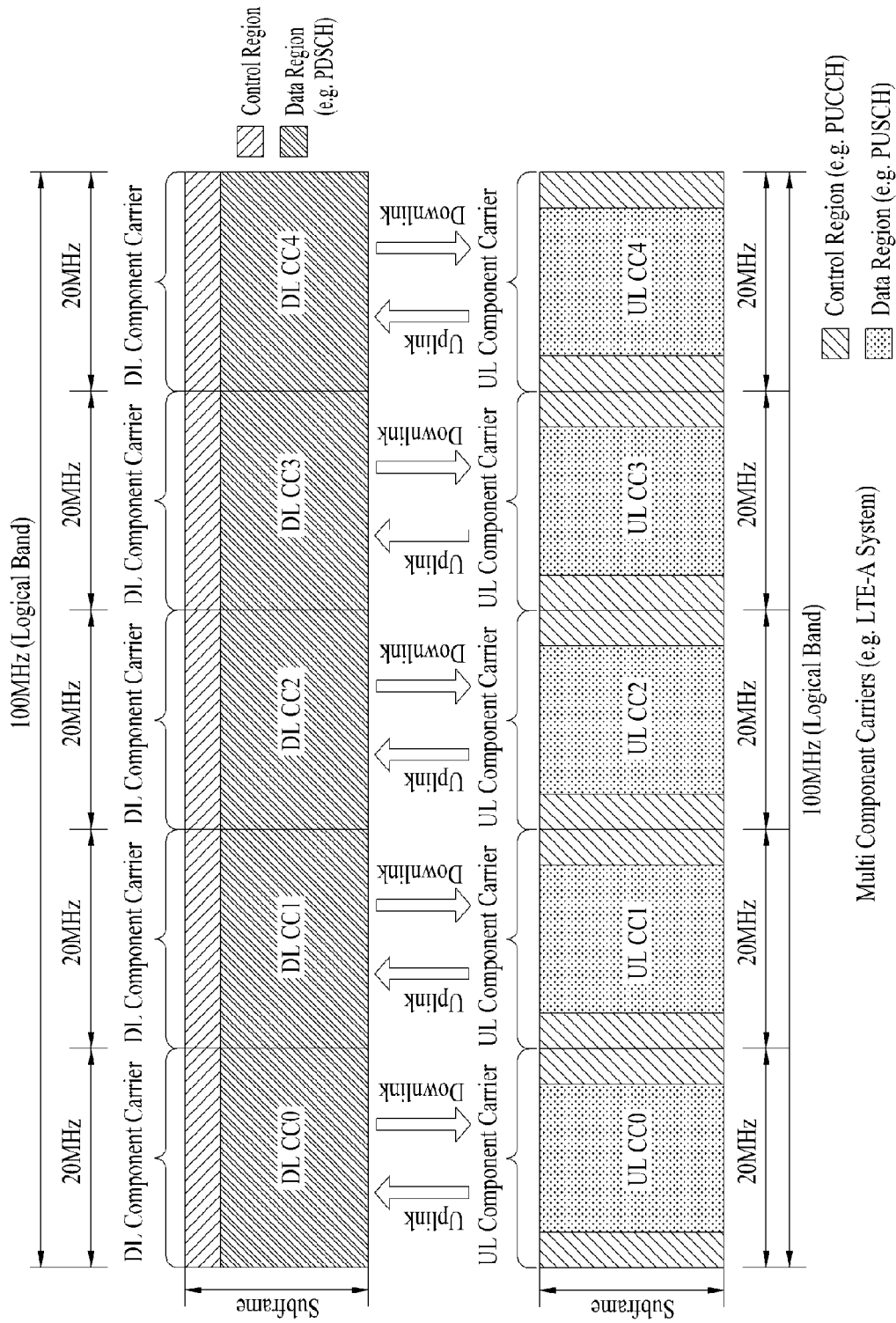
FIG. 8 illustrates a CA (carrier aggregation) communication system.

Referring to FIG. 7, two types of downlink RSs are defined for unicast service in LTE. The downlink RSs correspond to a common reference signal (CRS) (0~3) for channel state information acquisition and handover measurement and a UE-specific CRS (D) for data demodulation. The UE-specific RS is referred to as a dedicated RS (DRS). The UE-specific RS is used for data demodulation only whereas the CRS is used for channel information acquisition and data demodulation. The CRS is a cell-specific signal and is transmitted per subframe through the entire band. Since LTE supports a maximum of 4 transmit antennas on downlink, CRSs for up to 4 antenna ports can be transmitted according to the number of antenna ports of the eNB. CRSs for respective antenna ports are multiplexed in an RB according to FDM (frequency division multiplexing). FIG. 8 illustrates a carrier aggregation (CA) communication system. To use a wider frequency band, an LTE-A system employs CA (or bandwidth aggregation) technology which aggregates a plurality of UL/DL frequency blocks to obtain a wider UL/DL bandwidth. Each frequency block is transmitted using a component carrier (CC). The CC can be regarded as a carrier frequency (or center carrier, center frequency) for the frequency block.

Referring to FIG. 8, a plurality of UL/DL CCs can be aggregated to support a wider UL/DL bandwidth. The CCs may be contiguous or non-contiguous in the frequency domain. Bandwidths of the CCs can be independently determined Asymmetrical CA in which the number of UL CCs is different from the number of DL CCs can be implemented. For example, when there are two DL CCs and one UL CC, the DL CCs can correspond to the UL CC in the ratio of 2:1. A DL CC/UL CC link can be fixed or semi-statically configured in the system. Even if the system bandwidth is configured with N CCs, a frequency band that a specific UE can monitor/receive can be limited to M (<N) CCs. Various parameters with respect to CA can be set cell-specifically, UE-group-specifically, or UE-specifically. Control information may be transmitted/received only through a specific CC. This specific CC can be referred to as a primary CC (PCC) (or anchor CC) and other CCs can be referred to as secondary CCs (SCCs).

In LTE-A, the concept of a cell is used to manage radio resources. A cell is defined as a combination of downlink resources and uplink resources. Yet, the uplink resources are not mandatory. Therefore, a cell may be composed of downlink resources only or both downlink resources and uplink resources. The linkage between the carrier frequencies (or DL CCs) of downlink resources and the carrier frequencies (or UL CCs) of uplink resources may be indicated by system information. A cell operating in primary frequency resources (or a PCC) may be referred to as a primary cell (PCell) and a cell operating in secondary frequency resources (or an SCC) may be referred to as a secondary cell (SCell). The PCell is used for a UE to establish an initial connection or re-establish a connection. The PCell may refer to a cell indicated during handover. The SCell may be configured after an RRC connection is established and may be used to provide additional radio resources. The PCell and the SCell may collectively be referred to as a serving cell. Accordingly, a single serving cell composed of a PCell only exists for a UE in an RRC_CONNECTED state, for which CA is not set or which does not support CA. On the other hand, one or more serving cells exist, including a PCell and entire SCells, for a UE in an RRC_CONNECTED state, for which CA is set. For CA, a network may configure one or more SCells in addition to an initially configured PCell, for a UE supporting CA during connection setup after an initial security activation operation is initiated.

When cross-carrier scheduling (or cross-CC scheduling) is applied, a PDCCH for downlink allocation can be transmitted on DL CC #0 and a PDSCH corresponding thereto can be transmitted on DL CC #2. For cross-CC scheduling, introduction of a carrier indicator field (CIF) can be considered. Presence or absence of the CIF in a PDCCH can be determined by higher layer signaling (e.g. RRC signaling) semi-statically and UE-specifically (or UE group-specifically). The baseline of PDCCH transmission is summarized as follows.

CIF disabled CIF disabled: a PDCCH on a DL CC is used to allocate a PDSCH resource on the same DL CC or a PUSCH resource on a linked UL CC.

CIF enabled: a PDCCH on a DL CC can be used to allocate a PDSCH or PUSCH resource on a specific DL/UL CC from among a plurality of aggregated DL/UL CCs using the CIF.

When the CIF is present, the eNB can allocate a PDCCH monitoring DL CC to reduce BD complexity of the UE. The PDCCH monitoring DL CC set includes one or more DL CCs as parts of aggregated DL CCs and the UE detects/decodes a PDCCH only on the corresponding DL CCs. That is, when the eNB schedules a PDSCH/PUSCH for the UE, a PDCCH is transmitted only through the PDCCH monitoring DL CC set. The PDCCH monitoring DL CC set can be set in a UE-specific, UE-group-specific or cell-specific manner. The term "PDCCH monitoring DL CC" can be replaced by the terms such as "monitoring carrier" and "monitoring cell". The term "CC" aggregated for the UE can be replaced by the terms such as "serving CC", "serving carrier" and "serving cell".

Figure 9:
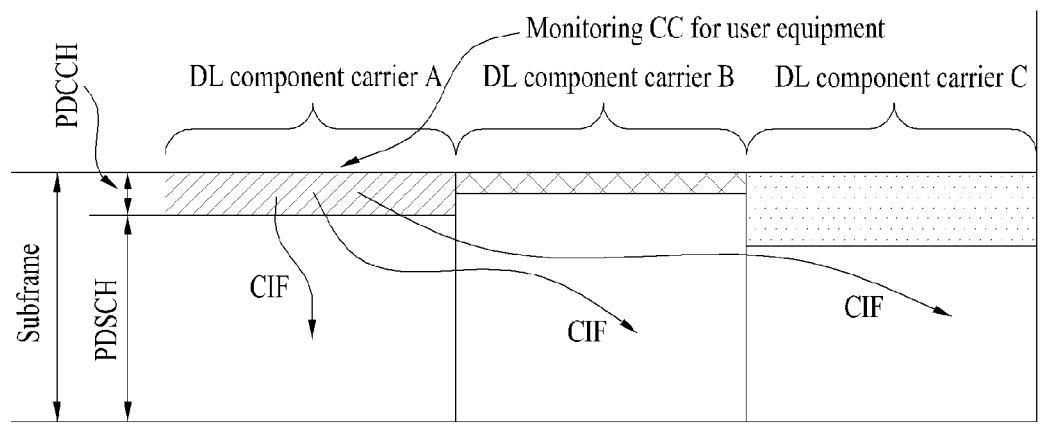
FIG. 9 illustrates cross-carrier scheduling.

FIG. 9 illustrates scheduling when a plurality of carriers is aggregated. It is assumed that 3 DL CCs are aggregated and DL CC A is set to a PDCCH monitoring DL CC. DL CC A, DL CC B and DL CC C can be called serving CCs, serving carriers, serving cells, etc. In case of CIF disabled, a DL CC can transmit only a PDCCH that schedules a PDSCH corresponding to the DL CC without a CIF according to LTE PDCCH rule. When the CIF is enabled, DL CC A (monitoring DL CC) can transmit not only a PDCCH that schedules the PDSCH corresponding to the DL CC A but also PDCCHs that schedule PDSCHs of other DL CCs using the CIF. In this case, A PDCCH is not transmitted in DL CC B/C which is not set to a PDCCH monitoring DL CC.

In a conventional TDD system, all cells perform downlink transmission or uplink transmission at specific time since the cells use the same UL-DL configuration. However, an evolved system such as LTE-A considers an independent UL-DL configuration per cell. In this case, different UL-DL configurations of cells may aggravate inter-cell interference.

Figure 10:
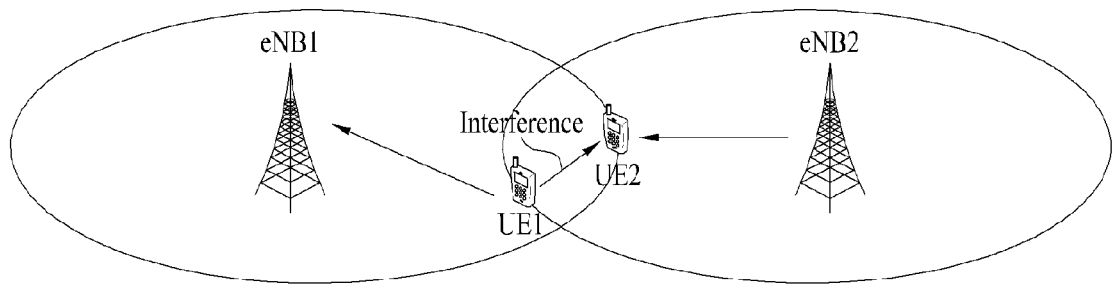
FIG. 10 illustrates inter-cell interference due to different UL-DL configurations in a TDD system.

FIG. 10 illustrates inter-cell interference due to different UL-DL configurations in a TDD system. It is assumed that UE1 belongs to eNB1 cell and UE2 belongs to eNB2 cell. D denotes a downlink subframe, U denotes an uplink subframe and S denotes a special subframe. FIG. 10 shows a case in which interference (referred to as UE-to-UE interference hereinafter) is applied by a UE to another UE.

Referring to FIG. 10, since two neighboring cells have different UL-DL configurations, the two cells can perform different types of transmission in the fifth and tenth subframes. That is, eNB1 cell can perform UL transmission (e.g. UE1=>eNB1) and eNB2 cell can perform DL transmission (e.g. eNB1=>UE1. In this case, a UE (e.g. UE2) that receives a DL signal from among UEs located at the common boundary of the two cells can suffer strong interference by the UE (e.g. UE1) that performs UL transmission. This is because UE2 receives the DL signal with a weak received signal strength from eNB 2 since UE2 is located at the cell edge whereas UE1 maintains high UL transmit power in consideration of the distance between UE1 and eNB1. Accordingly, the probability that DL transmission of eNB2 fails can increase. Here, the common boundary (or cell edge) of the two cells may refer to an area affected by transmission of a neighboring cell. The cell edge can be determined based on RSRP (reference signal received power)/RSRQ (reference signal received quality). Furthermore, a cell edge UE may refer to a UE remarkably affected by transmission of a neighboring cell.

Inter-cell interference due to different UL-DL configurations may occur among a plurality of carriers. For example, when a plurality of carriers is configured in an eNB and an independent UL-DL configuration is set per carrier, interference similar to that illustrated in FIG. 10 may be generated.

To solve the above-described problem, eNB2 can configure an ABS (almost blank subframe) discussed in eICIC (enhanced inter-cell interference cancellation). The ABS refers to a subframe in which only specific signals from among DL signals are transmitted. Here, the specific signals include a CRS, for example. The ABS can be regarded as a low loaded, low-power and low-interference subframe. Specifically, eNB1 may schedule UL transmission to UE1 in a subframe configured as an ABS and may not schedule UL transmission to UE1 in other subframes. In this case, DL performance deterioration of UE2 due to UL interference from UE1 can be decreased. However, since some signals (e.g. CRS) used for measurement can be transmitted in an ABS, a mechanism for securing the quality of the signals is needed. This is because UE2 may announce radio link failure and reselect a cell when UL interference of UE1 affects eNB2 CRS reception performance of UE2 since the CRS is used for a UE to determine whether a radio link fails or not.

Figure 11:
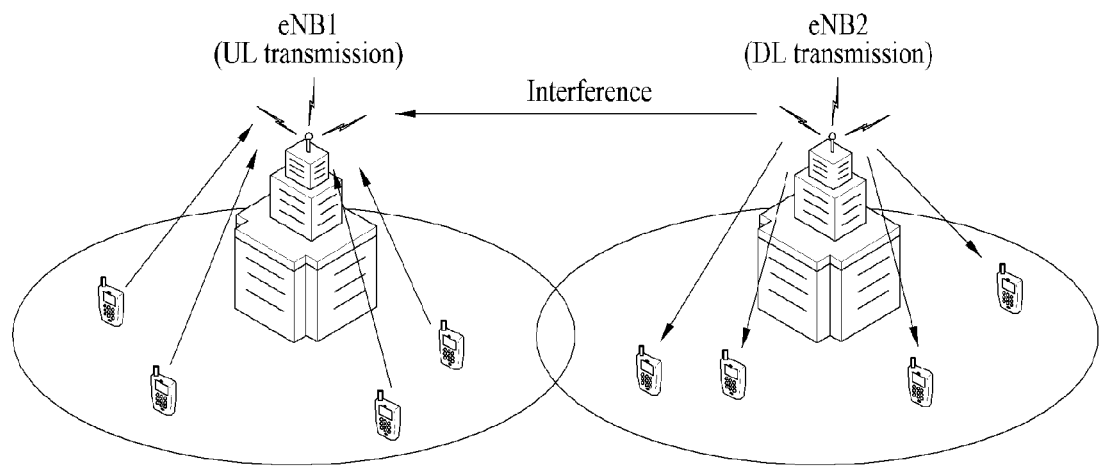
FIG. 11 illustrates a case in which DL transmission of a cell is applied as interference to UL transmission of another cell.

FIG. 11 illustrates a case in which interference is generated due to LOS (line of sight) between eNBs since the eNBs are installed on buildings, for example. In this case, DL transmission of one cell may interfere with UL transmission of the other cell. FIG. 11 shows interference applied by an eNB to another eNB (referred to as eNB-to-eNB interference hereinafter).

Referring to FIG. 11, severe interference due to DL transmission of eNB2 may affect UL transmission of eNB1 in a subframe which is set as a UL subframe for eNB1 and set as a DL subframe for eNB2. FIG. 11 illustrates a case in which eNB1 suffers severe interference due to LOS from DL transmission of eNB2 while receiving UL signals transmitted from UEs in the corresponding cell because a DL signal of eNB2 may be less attenuated due to LOS although the distance between eNB1 and eNB2 is long whereas UL signals of UEs belonging to eNB1 is attenuated due to path loss. eNB-to-eNB interference as illustrated in FIG. 11 can be mitigated like UE-to-UE interference by configuring an ABS by eNB2. However, some signals (e.g. CRS) are transmitted in the ABS as described above, and thus interference due to the signals may affect UL performance of eNB1.

The present invention proposes a method for mitigating interference that can be generated when a DL resource region (e.g. DL subframe) and a UL resource region (e.g. UL subframe) are simultaneously present in different cells (e.g. eNBs or carriers) (that is, different cells share the same frequency/time resource).

The present invention can be used to reduce interference that can be generated when a region, which is used as a DL resource in a cell, is used as a UL resource in another cell. In addition, the present invention is applicable to a case in which DL transmission of a carrier acts as interference on UL transmission of another carrier (or UL transmission of a carrier acts as interference on DL transmission of another carrier) in a CA system. Furthermore, the present invention can be used to control interference generated when a UL resource (or DL resource) of a specific cell or carrier is used for DL transmission (or UL transmission) while plural cells or carriers use the same UL/DL configuration. Specifically, the present invention can be used to reduce inter-cell interference generated when frame type 2 (TDD system) of LTE-A is used and neighboring cells use different UL-DL configurations.

In the following description, a cell is defined as a combination of a DL resource and a UL resource and a UL resource is not an essential element. Accordingly, the cell can be composed of the DL resource only or the DL resource and UL resource. When a resource is defined in terms of carriers, an eNB includes one cell in a single-carrier system. In a multi-carrier system, an eNB includes a plurality of cells each of which corresponds to one carrier. In a single-carrier system, a cell is equivalent to an eNB and the term "cell" can be used interchangeably with "eNB". Operation of a cell refers to operation of a corresponding eNB with respect to the cell. In addition, signaling between cells can be performed through an interface (e.g. X2 interface) between eNBs or interfaces in the eNBs.

While the following description focuses on control of interference between two cells to aid in understanding the present invention, the present invention can be applied to a case in which interference among three or more cells is controlled equally/similarly. When two cells are present, one cell can be referred to as a source cell (or transmission cell or serving cell) and the other can be referred to as a reception cell (or cooperative cell, neighbor cell or surrounding cell) for signaling between cells.

Specifically, the present invention limits UL signal transmission (activation) in a specific time-frequency resource or a resource of a predetermined region including the same (e.g. zero-power transmission or low-power transmission) in order to mitigate UE-to-UE interference (refer to FIG. 10) and eNB-to-eNB interference (refer to FIG. 11). A specific time-frequency UL resource or a UL resource of a specific region including the same according to the present invention can be referred to as a no-transmission UL resource, zero-power UL resource, transmission limit UL resource, lower-power UL resource, low-activation UL resource, etc. For convenience, this UL resource is called a zero-power UL resource. In one embodiment, UL transmission (activation) limitation according to the present invention can be implemented through puncturing or rate matching in a UL transmission procedure. For example, frequency-time resources corresponding to DL signals (e.g. CRS) transmitted from a first cell (DL transmission cell) or resources of a specific region including the same can be punctured or rate-matched in UL signals (e.g. PUSCH (or PUCCH) signals) transmitted from UEs of a second cell.

Operations according to the present invention are applicable to only a case in which a subframe in which UL transmission is performed is set as an ABS in a neighbor cell. Here, the ABS may refer to a low-load subframe, low-power subframe or low-interference subframe, in general.

The method according to the present invention can be used for eNB2 cell measurement, that is, protection of DL transmission of eNB2 in the case of UE-to-UE interference of FIG. 10. In addition, the method according to the present invention can be used to mitigate interference due to a specific signal (e.g. CRS) of eNB2 cell, that is, to protect UL transmission of eNB1 cell in the case of eNB-to-eNB interference of FIG. 10.

Figure 12:
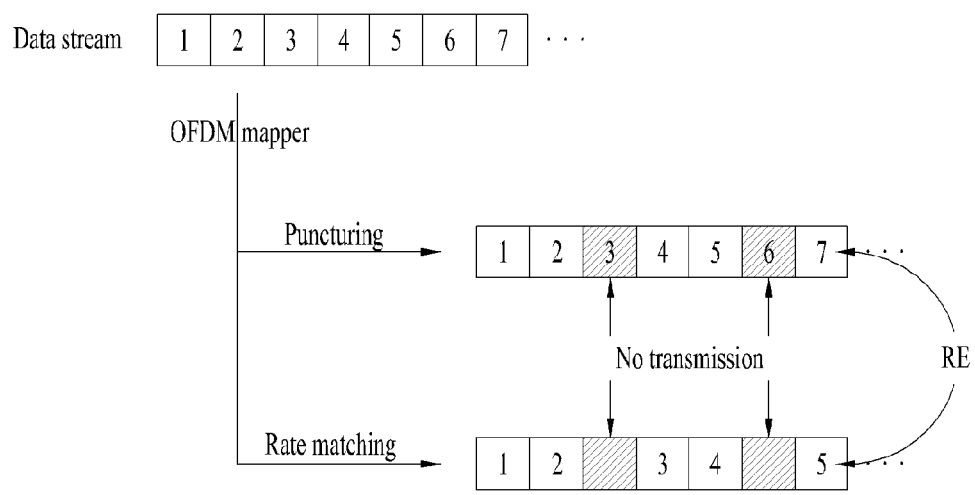
FIG. 12 illustrates puncturing and rate matching performed at a transmitter (e.g. UE) to reduce inter-cell interference according to an embodiment of the present invention.

FIG. 12 illustrates puncturing and rate matching performed at a transmitter (e.g. UE) to mitigate inter-cell interference according to an embodiment of the present invention. It is assumed that REs #3 and #6 include zero-power UL resources.

Referring to FIG. 12, a data stream is mapped to REs constituting a resource grid (refer to FIG. 4) and then converted into OFDM symbols. Here, the data stream can refer to modulated symbols. In this case, the UE can puncture or rate-match frequency-time resources corresponding to some DL signals (e.g. CRS) transmitted from a neighbor cell or resources of a predetermined region including the frequency-time resources in UL signals (e.g. PUSCH (or PUCCH) signals) transmitted from UEs of a second cell. Specifically, the UE can map the modulated symbols to all REs allocated thereto and generate OFDM symbols with specific REs vacant (puncturing) or map the modulated symbols to REs other than specific REs from among the REs allocated thereto (rate matching). The modulated symbols mapped to REs can be converted into OFDM or SC-FDMA symbols and transmitted on uplink. In the case of FIG. 12, modulated symbols #1, #2, #4, #5 and #7 are transmitted when puncturing is applied and modulated symbols #1, #2, #3, #4 and #5 are transmitted when rate matching is applied.

According to the present invention, UE2 can be prevented from reselecting a cell due to severe interference in FIG. 10 and eNB1 can prevent interference due to specific signals of eNB2 from affecting UL transmission during decoding in FIG. 11.

Inter-Cell Signaling (e.g. X2 Signaling)

To implement the present invention, eNB1 and eNB2 can exchange all or some information described below through inter-cell interference (e.g. X signaling). It is assumed that eNB1 and eNB2 know cell IDs of the corresponding cells.

1. ABS Information

A. eNB1 can signal ABS configuration information to eNB2. The ABS configuration information can include information about a subframe set that indicates whether an ABS is allocated or not. The information about the subframe set can be indicated using a bitmap. For example, a subframe corresponding to a bit '1' can be used as the ABS.

2. Type of Transmitted Signal

A. eNB1 can signal, to eNB2, the type of a signal transmitted in the corresponding subframe, such as an RS, BCH (broadcast channel), SCH (synchronization channel), etc. In this case, eNB2 (or a UE linked to eNB2) can perform puncturing or rate matching in resources through which the corresponding signal is transmitted.

B. When eNB2 knows the type of the signal transmitted from eNB1, this information can be omitted.

C. This information can be interpreted as information by which eNB2 indicates signals that need to be protected in the cell corresponding to eNB2 through X2 interface in the case of UE-to-UE interference (FIG. 10). This information can be interpreted as information by which eNB2 signals, to eNB1, signals that can act as interference on the eNB1 cell from among signals of eNB2 so as to induce interference mitigation in the eNB1 cell in the case of eNB-to-eNB interference (FIG. 11).

3. Resource Region to which Transmitted Signals Belong

A. When transmitted signals are present in a specific region (e.g. antenna port, data/control region, OFDM symbol(s), etc.), the region can be signaled.

B. For example, eNB1 can inform eNB2 that only a CRS is transmitted in an ABS. Otherwise, eNB1 can inform eNB2 that only a CRS of port #0 is transmitted in an ABS. Alternatively, when a CRS is transmitted through a specific OFDM symbol set only, eNB1 can signal the corresponding OFDM symbols to eNB2.

UE Dedicated Signaling

In the present embodiment, an eNB, which receives UL signals in a subframe in which DL transmission and UL transmission of neighboring cells collide with each other, signals information for limiting UL transmission activation to UEs belonging to the corresponding cell. For example, an eNB, which receives UL signals in a subframe in which DL transmission and UL transmission of neighboring cells collide with each other, can signal a punctured or rate-matched pattern to UEs belonging to the corresponding cell. Here, signaling can be limited to UEs (i.e. cell edge UEs) close to a neighbor cell that needs coordination. The cell edge UEs can be determined based on channel measurement results such as RSRP (reference signal received power), etc. In the present embodiment, signaling information can be configured based on the above-described information indicated through X2 signaling with a neighbor cell and can include the following information.

1. Information Representing Whether Puncturing or Rate Matching is Performed

A. Whether puncturing or rate matching is performed on signaled resources can be signaled to UEs.

2. Resource on which Puncturing or Rate Matching is Performed

A. Puncturing or rate matching of a specific RE or a specific region can be signaled on the basis of information on a cooperative cell, transmitted through X2 signaling.

B. For example, rate matching of a specific OFDM symbol can be signaled. This can maintain single carrier property. A UE can map modulated symbols to regions other than the signaled OFDM symbol to perform UL transmission.

C. Alternatively, puncturing or rate matching of a CRS position of a specific antenna port can be signaled.

Receiver Puncturing for Cancelling eNB-to-eNB Interference

The above-described puncturing procedure performed by the transmitter requires UE-dedicated signaling for indicating a resource that needs to be punctured to the corresponding UE. In the present embodiment, puncturing is performed at an eNB receiver to reduce eNB-to-eNB interference. Puncturing at the eNB receiver can be performed in such a manner that a UE carries out UL transmission in the conventional manner and the eNB decodes a portion of received UL data other than specific REs or elements of a specific resource region (e.g. inserts 0 into corresponding positions) according to information on a neighbor cell, indicated through X2 signaling (proposed above). When the receiver performs puncturing, a UE can be implemented without being affected and interference from a neighbor cell can be mitigated according to cooperation between eNBs (e.g. X2 signaling).

Figure 13:
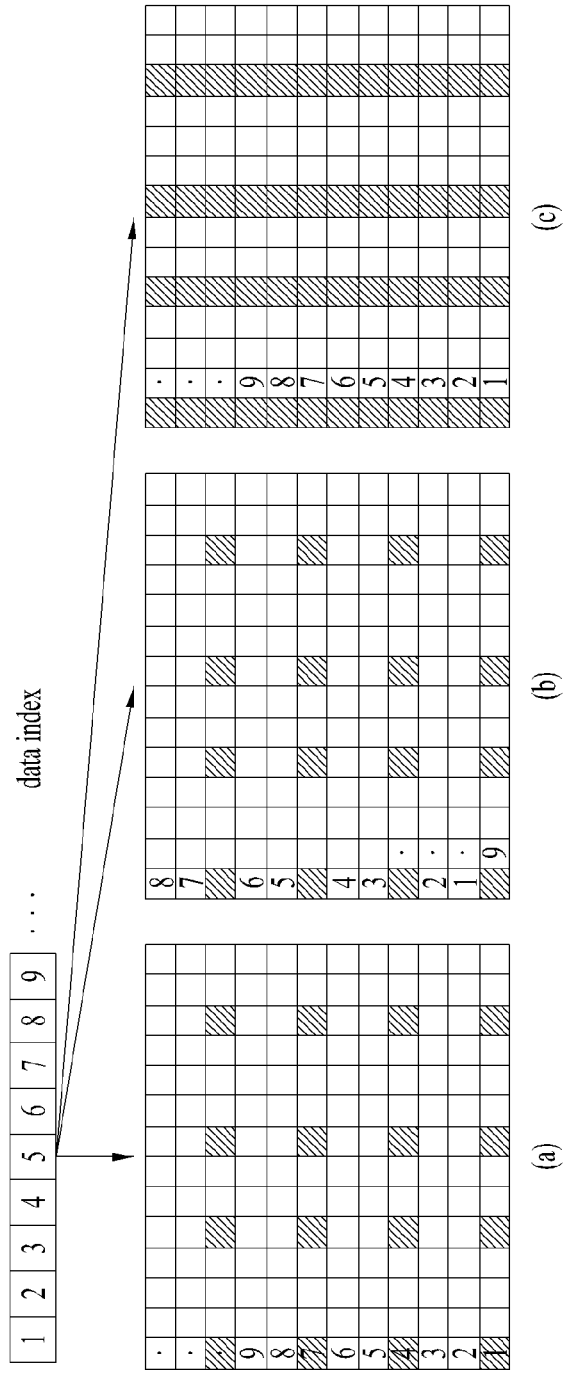
FIG. 13 illustrates signal transmission according to an embodiment of the present invention.

FIG. 13 illustrates signal transmission according to an embodiment of the present invention. FIG. 13 shows a UL resource mapping method of a UE on the assumption that a cell (eNB2 in FIGS. 10 and 11) performing DL transmission configures ABSs each of which includes a CRS only and the number or Tx antennas is 2. FIGS. 13(a) and 13(b) illustrate embodiments of UL data mapping when puncturing and rate matching are performed on a CRS transmitted from eNB1. In FIG. 13, shaded portions represent REs in which data is not transmitted. FIG. 13(c) illustrates a case in which rate matching is performed on all REs belonging to OFDM symbols through which a CRS of eNB2 is transmitted.

The above description can be used for interference control in single-cell operation and multi-cell operation and is applicable to a special case in which UL transmission and DL transmission are simultaneously performed or switched.

Figure 14:
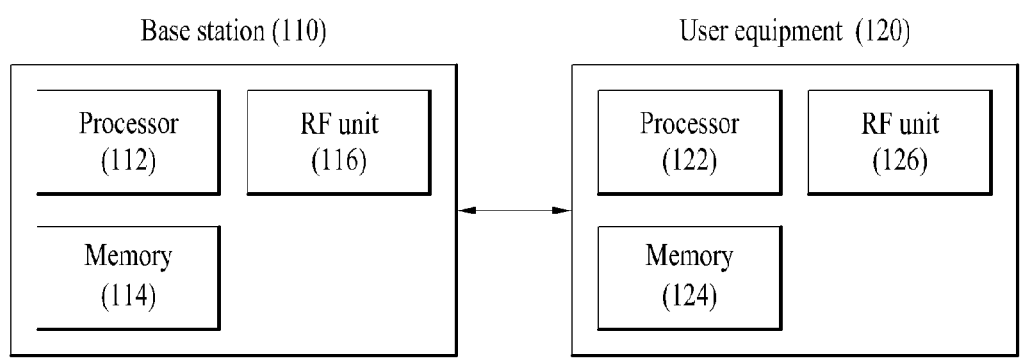
FIG. 14 illustrates a base station (BS) and UE applicable to embodiments of the present invention.

FIG. 14 illustrates a BS and UE applicable to embodiments of the present invention. When a wireless communication includes a relay, communication through a backhaul link is performed between the BS and the relay and communication through an access link is carried out between the relay and the UE. Accordingly, the BS or UE shown in FIG. 14 can be replaced by the relay.

Referring to FIG. 14, a wireless communication system includes a BS 110 and a UE 120. The BS includes a processor 112, a memory 114 and an RF unit 116. The processor 112 may be configured to implement the procedures and/or methods proposed by the present invention. The memory 114 is connected to the processor 112 and stores information related to operations of the processor 112. The RF unit 116 is connected to the processor 112 and transmits and/or receives an RF signal. The UE 120 includes a processor 122, a memory 124 and an RF unit 126. The processor 112 may be configured to implement the procedures and/or methods proposed by the present invention. The memory 124 is connected to the processor 122 and stores information related to operations of the processor 122. The RF unit 126 is connected to the processor 122 and transmits and/or receives an RF signal. The BS 110 and/or UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to a UE, a BS or other apparatuses of a wireless communication system. Specifically, the present invention can be applied to a method for controlling inter-cell interference and an apparatus for the same.

The invention claimed is:

1. A method for transmitting an uplink (UL) signal in a time division duplex (TDD) wireless communication system, the method comprising:
   receiving a specific signal from a serving cell through specific time-frequency resources;
   receiving an indicator indicating whether puncturing or rate matching is performed on the specific time-frequency resources; and
   transmitting a UL signal on one or more time-frequency resources except the specific time-frequency resources after performing puncturing or rate matching according to the indicator.

2. The method according to claim 1, wherein the specific signal corresponds to at least one of a reference signal (RS), a broadcast channel (BCH) and a synchronization channel (SCH).

3. The method according to claim 1, wherein the UL subframe includes a plurality of single carrier frequency division multiple access (SC-FDMA) symbols, signal transmission of SC-FDMA symbols corresponding to the specific time-frequency resources being limited.

4. The method according to claim 1, wherein if the indicator indicates the puncturing is performed on the specific time-frequency resources, limitation of signal transmission through the specific time-frequency resources comprises mapping UL data to all allocated time-frequency resources including the specific time-frequency resources and then puncturing the UL data in the specific time-frequency resources.

5. The method according to claim 1, wherein if the indicator indicates the rate matching is performed on the specific time-frequency resources, limitation of signal transmission through the specific time-frequency resources comprises mapping UL transmission data to time-frequency resources on the UL subframe while skipping at least the specific time-frequency resources.

6. A communication apparatus configured to transmit a UL signal in a TDD wireless communication system, the communication apparatus comprising:
   a radio frequency (RF) unit; and
   a processor configured to control the RF unit,
   wherein the processor is configured to receive a specific signal from a serving cell through specific time-frequency resources, to receive an indicator indicating whether puncturing or rate matching is performed on the specific time-frequency resources, and to transmit a UL signal on one or more time-frequency resources except the specific time-frequency resources after performing puncturing or rate matching according to the indicator.

7. The communication apparatus according to claim 6, wherein the specific signal corresponds to at least one of a reference signal (RS), a broadcast channel (BCH) and a synchronization channel (SCH).

8. The communication apparatus according to claim 6, wherein the UL subframe includes a plurality of SC-FDMA symbols, signal transmission of SC-FDMA symbols corresponding to the specific time-frequency resources being limited.

9. The communication apparatus according to claim 6, wherein if the indicator indicates the puncturing is performed on the specific time-frequency resources, limitation of signal transmission through the specific time-frequency resources comprises mapping UL data to all allocated time-frequency resources including the specific time-frequency resources and then puncturing the UL data in the specific time-frequency resources.

10. The communication apparatus according to claim 6, wherein if the indicator indicates the rate matching is performed on the specific time-frequency resources, limitation of signal transmission through the specific time-frequency resources comprises mapping UL transmission data to time-frequency resources on the UL subframe while skipping at least the specific time-frequency resources.

* * * * *